United States Patent [19]

Rankin et al.

[11] 4,127,563

[45] Nov. 28, 1978

[54] LOW PH PREPARATION OF CATIONIC STARCHES AND FLOURS

[75] Inventors: John C. Rankin; Bliss S. Phillips, both of Peoria, Ill.

[73] Assignee: The United States of America as represented by the Secretary of Agriculture, Washington, D.C.

[21] Appl. No.: 811,399

[22] Filed: Jun. 29, 1977

[51] Int. Cl.$^2$ .............................................. C08B 31/08
[52] U.S. Cl. ..................................... 536/50; 106/150; 162/175
[58] Field of Search .......................... 536/50; 106/150

[56] References Cited

U.S. PATENT DOCUMENTS

| 2,813,093 | 11/1957 | Caldwell et al. | 536/50 |
|---|---|---|---|
| 2,876,217 | 3/1959 | Paschall | 536/50 |
| 2,920,140 | 1/1961 | Hullinger et al. | 536/50 |
| 3,243,426 | 3/1966 | Caesar | 536/50 |
| 3,346,563 | 10/1967 | Shildneck et al. | 536/50 |
| 3,422,087 | 1/1969 | Caesar et al. | 536/50 |
| 3,448,101 | 6/1969 | Billy et al. | 536/50 |
| 3,522,238 | 7/1970 | Rankin et al. | 536/50 |
| 3,578,475 | 5/1971 | Alexander et al. | 536/50 |
| 3,666,751 | 5/1972 | Jarowenko et al. | 536/50 |
| 3,674,725 | 7/1972 | Aitken et al. | 536/50 |
| 3,721,575 | 3/1973 | Jarowenko | 536/50 |
| 3,737,370 | 6/1973 | Jarowenko | 536/50 |
| 3,842,005 | 10/1974 | Moser et al. | 536/50 |

*Primary Examiner*—Melvyn I. Marquis
*Attorney, Agent, or Firm*—M. Howard Silverstein; David G. McConnell; Curtis P. Ribando

[57] ABSTRACT

A novel process is disclosed for preparing cationic starches and flours by reacting starch-containing materials in a dry state with a halohydrin at a pH of 9 or below without the necessity for subsequent alkali neutralization or washing. The resultant products have cationic properties remarkably superior to prior art cationic starches over a broad range of acid and alkaline pH's. In the manufacture of paper, they serve as excellent pigment retention and dry-strength improvement agents.

11 Claims, No Drawings

LOW PH PREPARATION OF CATIONIC STARCHES AND FLOURS

BACKGROUND OF THE INVENTION

1. Field of the Invention

The extensive use of the paper and mineral separation industries of cationic products as pigment retention aids capable of adjunctly serving as internal sizing agents or as flocculants has stimulated the introduction of a variety of cationic starches and flours resulting from the reaction of starchy materials with different organic nitrogen compounds. Several methods and reagents have been proposed in the last 20 years for preparation of cationic starches and flours.

2. Description of the Prior Art

Patents covering this field are well cited in review articles: *Industrial Starches, Chemical Technology*, Review No. 23, Ronald W. James, "Cationic Starches," pp. 98-140, Noyes Data Corporation, Park Ridge, N.J. (1974); *Starch: Chemistry and Technology*, Vol. 2, R. L. Whistler and E. F. Paschall, "Production and Uses of Cationic Starches," pp. 403-422, Academic Press, New York (1967); *Starch and Its Derivatives*, 4th Edition, J. A. Radley, "The Starch Esters and Ethers," pp. 385-419, Chapman and Hall Ltd., 11 New Fetter Lane, London EC4 (1968). Briefly, cationic starchy materials prepared with cation-bearing nitrogen reagents fall into two general categories. The first category includes those that are prepared in the presence of either small amounts of alkali or none at all using nitrogen reagents with alkylene epoxide groups as taught in U.S. Pat. Nos. 3,422,087, 3,448,101, 3,674,725; or using alkylene imines as taught in U.S. Pat. No. 3,522,238. The mechanism of this reaction is an addition etherification of the reagents with the starchy materials. The nature of this type of reaction precludes the formation of products having high cationic efficiencies. Generally, the efficiencies are in the range of 50-60%, thereby limiting the products' applications. The second category includes those that must be prepared in the presence of high amounts of alkali (3-15 weight percent starch basis, pH >9) using nitrogen reagents with alkylene halides and/or alkylene epoxide groups as taught in U.S. Pat. Nos. 2,813,093, 2,876,217, 2,970,140, 3,346,563, 3,578,475, 3,666,751, 3,721,575, 3,737,370. The reaction mechanism for the alkylene halides is a substitution etherification with the starchy materials. Use of such high alkali concentrations and high pH's introduces a number of economical, ecological, energy-consuming, and end-use problems. The stability and utility of the products are greatly reduced unless they are neutralized and washed at the completion of the etherification to reduce their basicity and remove the neutral salts. This, of course, greatly increases the cost of the process, along with the original higher cost of using more alkali for the reaction. The neutralization and wash waters also create pollution problems. These factors all reduce the commercial desirability of the prior art methods of producing cationic starches.

SUMMARY OF THE INVENTION

Surprisingly, we have now discovered the unpredicated reaction of starch-containing materials in a dry state with halohydrins in a pH range of 9 or below without the necessity for subsequent alkali neutralization or washing. Cationic starchy products produced by this process have cationic properties remarkably superior to prior art cationic starches over a broad range of acid and alkaline pH's. In the manufacture of paper, they serve as excellent pigment retention and dry-strength improvement agents. We are, of course, aware that cationic starch ethers have been prepared with similar reagents by Shildneck et al. in U.S. Pat. No. 3,346,563. However, their preferred reaction pH range is 10.5-11.5 or in some cases as high as pH 12-13. In fact, they teach that starch etherification with the preferred reagent, vicchlorhydroxypropyltrimethylammonium chloride, is only appreciable at pH 9.5 and increases with increasing pH. Reaction mixtures must be neutralized and washed to obtain products for end-use. Shildneck et al. also believe that in the presence of a high alkali concentration, an intermediate reaction takes place by which the halohydroxypropyltrimethylammonium chloride is cyclized to form the epoxide and in turn reacts with the starch as an addition etherification. We have found as established in the examples below that the products prepared by the instant method have unexpectedly higher cationic efficiencies than when the known epoxide of the instant halohydrins is formed by cyclizing with alkali outside the reaction mixture then added to the starch. Therefore, it is doubtful that our products are formed by an addition reaction mechanism from formation of the epoxide. This makes our discovery even more surprising because halogenated substitution etherification of starch heretofor has been taught to occur only under strongly alkali conditions of above pH 9.

DETAILED DESCRIPTION OF THE INVENTION

Starch-containing materials (SCM) useful in this invention include starches and flours of cereal grains such as corn, wheat, sorghum, rice, etc. and of root crops such as potato, tapioca, etc. The starches may be unmodified or modified by procedures by which they are dextrinized, hydrolyzed, oxidized, or derivatized as long as they retain free hydroxyl groups as reactive sites for subsequent etherification. Starch fractions, namely, amylose and amylopectin, may also be employed. These SCM preferably contain their normal moisture content of 10 to 15%, though moistures as high as about 25% can be employed if it is not raised much beyond this level by addition of the etherifying reagent.

The etherifying reagent is a halohydrin having the structural formula

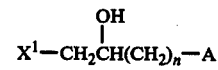

wherein:

A is

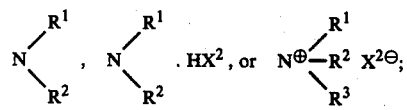

$R^1$ and $R^2$ are independently selected from the group of $C_1$-$C_4$ straight or branched alkyl radicals or they are joined to form a cyclic structure, and $R^3$ is hydrogen or a $C_1$-$C_4$ straight or branched alkyl radical, with the proviso that the total number of carbon atoms in $R^1$, $R^2$, and $R^3$ does not exceed 8; $X^1$ and $X^2$ are halogen atoms; and $n$ is 1-3.

Normally, the halogen X would be either Br or Cl and n would be 1. As for the amine group, the quaternary amine,

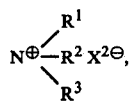

has the most cationic activity and is preferred when the cationic starch is intended as a paper additive. Generally, the preferred compound for use in this invention is 3-chloro-2-hydroxypropyltrimethylammonium chloride,

Expressed in terms of its nitrogen content, the amount of reagent for use in the etherifying reaction should be less than about 0.9% nitrogen, and preferably in the range of 0.3–0.8% nitrogen, based upon the dry weight of the SCM. For 3-chloro-2-hydroxypropyltrimethylammonium chloride, these values correspond to a maximum reagent weight of 12% and a preferred range of 4–11% based on the dry weight of the SCM.

For the reaction between the SCM and the etherifying reagent to proceed and yield an operative high quality product, it is necessary that the reaction mixture be adjusted from its inherent pH value of about 4 to within a pH range of 5–9. At pH's less than 5, very little cationic starch, if any, is produced. At pH's higher than 9, the basicity of the resultant product would require its neutralization and washing. To achieve this reaction pH range of our invention, a small amount of alkali is admixed with the SCM prior to, simultaneous with, or subsequent to addition of the reagent. Metal oxides or hydroxide of sodium, potassium, calcium, magnesium, etc. are suitable. The amount of alkali varies with the amount of etherifying reagent and usually follows a direct weight proportion. It also varies as to whether starch or flour is being etherified. Because of the buffering effect of flour protein, more alkali is needed over that used for starch to achieve the desired pH range. For the preferred range of etherifying reagent as stated above, the desired pH reaction range is achieved with alkali levels of about 0.7–1.8% (d.w.b. starch) for starch and about 1.2–2.5% (d.w.b. flour) for flour.

When admixed with the SCM, the etherifying reagent and the alkali additives may be in either a dry powdery state or else dissolved or dispersed in a liquid vehicle such as water. If a vehicle is employed, its level should be limited to the extent that it does not raise the total moisture content of the reaction mixture beyond about 25% whereby the starch would become sticky. A reaction mixture so characterized is defined herein as being in the dry state. Suitable reaction vessels include mixers of the conventional types used in industry, such as sigma blades, ribbon blades, pin blades, etc. For optimum distribution, it is preferred that the additives be sprayed onto the SCM during mixing. We have found that continued mixing is optional once the additives have been thoroughly impregnated into the SCM. This may vary from a few minutes to several hours depending on the efficiency of equipment and the scale of run. The point of thorough impregnation would be readily determinable by a person of ordinary skill in the art.

The reaction temperatures are normally held within the range of about 25°–100° C. for inversely related periods of time ranging from a week to 2 hours, depending upon the other conditions such as pH and homogeneity of the reaction mixture. Usually, at 25° C., the reaction is complete in 1–3 days, and at 60° C. in 2–6 hours.

The cationic starches produced by this method are generally characterized by cationic efficiencies in the range of 70–100%, depending upon the extent the reaction is permitted to proceed. If reacted to completion within the limits of the time and temperature parameters set forth above, cationic efficiencies on the order of 99–100% are normally obtained. The pH remains relatively constant throughout the reaction, and it is unnecessary to neutralize and wash the resultant products prior to use.

The cationic starches produced by this method can be used in whatever application cationic starches are conventionally employed as known in the art, and over a broad range of acid and alkaline pH's from about 5–9. In the manufacture of paper, they are useful pigment retention aids and strengthening agents when added to the wet pulp in concentrations on the order of about 0.1 to 1% based on the dry weight of the pulp. These products may also be used in conjunction with other additives which are compatible with the cationic functionality as easily determined by a person in the art.

Test Methods

For purposes of evaluating the cationic starches prepared in the examples below, the following test procedures were employed.

1. pH was measured with a Beckman meter on a 1–2% aqueous pasted sample. The pasting procedures were water bath or steam jet cooking as described in Die Stärke 28(5): 174 (1976).

2. Cationic efficiency was determined by a modified procedure of Mehltretter et al., Tappi 46(8): 506 (1963) as reported in Tappi 52(1): 82 (1969). Briefly, percent efficiency was obtained photometrically when a 0.5% paste (cooked by water bath) sample is tested for the retention on dilute cellulosic pulp fibers of "Halopont Blue" (an intensely blue organic pigment).

3. Streaming current values were measured with a Streaming Current Detector manufactured by Water Associates, Inc., Framingham, Mass. The instrument determines the magnitude of the cationic (positive) or anionic (negative) charge possessed by a sample. A 0.5% pasted sample (water bath cooked) was tested for these values (SCV) at various pH levels. The pH value was obtained by adjusting the paste solution with either 1N HCl or NaOH solutions.

4. Handsheets were made and tested by procedures cited in Tappi 52(1): 82 (1969). Controls containing no product additive as well as those containing 1% of product additive based on oven dried unbleached pulp were prepared. The percent increase in sheet properties due to the additive were reported. Products tested were 1% pasted samples prepared by steam jet cooking. Bleached handsheets containing clay pigment ("Huber Hi White" manufactured by J. M. Huber Corporation) were also made and tested as above with an additional test of ashing the sheet to determine the retention of clay pigment by the pulp.

5. Nitrogen determinations on samples were obtained by Kjeldahl analyses and moisture content on samples by drying them to constant weight at 100° C. in vacuo over phosphorous pentoxide.

The following examples are intended only to further illustrate the invention and are not intended to limit the scope of the invention which is defined by the claims.

EXAMPLE 1

Two hundred grams (dry basis) of commercially obtained wheat starch having a 14% moisture content and 0.08% Kjeldahl nitrogen was placed in a laboratory model sigma blade kneading machine equipped with a removable transparent plastic cover, reagent admitting means, and a valved jacket for confining steam or coolant. Powdered sodium hydroxide 1.4 g. (0.7 weight percent starch basis) was flaked in while mixing the starch. Mixing was continued ½ hour before spraying onto the starch in 10 minutes while mixing 12 g. of a 50% aqueous solution of 3-chloro-2-hydroxypropyl-trimethylammonium chloride as the etherifying reagent, obtainable as a commercial product from the Dow Chemical Company, Midland, Mich., or Story Chemical Corporation, Muskegon, Mich. (assay: 50% active reagent in water, pH 6.5–7.5 with 100 p.p.m. max. 1,3-chloropropanol and 5 p.p.m. max. epichlorohydrin). Mixing was continued another ½ hour, stopped, and an initial sample removed for analyses. A cooked aqueous paste of the sample showed pH 8, cationic efficiency 63%, and SCV at pH 10, −1.9. Mixing was continued for 6 hours maintaining the temperature at 60° C. The final product was then removed from the reactor and had 11% moisture and 0.32% nitrogen. A pasted sample gave pH 8, cationic efficiency 99%, and SCV at pH 10, +6.3. A superior operative final cationic product is indicated by the presence of significantly increased retention efficiency of Halopont pigment dye (cationic efficiency) by the pulp and in the magnitude of the positive (cationic) charge at pH 10 (SCV) over those of the initial sample.

EXAMPLE 2

Example 1 was repeated excepting 2.0 g. (1.0 weight percent) powdered sodium hydroxide and 17 g. of the etherifying reagent were used. The initial sample showed pH 6, cationic efficiency 68%, and SCV at pH 10, −2.3. The final product had 11% moisture, 0.43% nitrogen, pH 6, cationic efficiency 99%, and SCV at pH 10, +4.5.

EXAMPLE 3

Example 1 was repeated excepting 2.6 g. (1.3 weight percent) powdered sodium hydroxide and 24 g. of the etherifying reagent were used. The initial sample showed pH 6, cationic efficiency 69%, and SCV at pH 10, −1.4. The final product had 12% moisture, 0.65% nitrogen, pH 6, cationic efficiency 100, and SCV at pH 10, +9.3.

EXAMPLE 4

Example 1 was repeated excepting 3.6 g. (1.8 weight percent) powdered calcium oxide and 28.7 g. of the etherifying reagent were used. The initial sample showed pH 7, cationic efficiency 68%, and SCV at pH 10, −1.4. The final product had 14% moisture, 0.79% nitrogen, pH 7, cationic efficiency 99%, and SCV at pH 10, +5.5.

EXAMPLE 5

Example 1 was repeated excepting 5.2 g. (2.6 weight percent) powdered sodium hydroxide and 24 g. of the etherifying reagent were used. The initial sample showed pH 9, cationic efficiency 63%, and SCV at pH 10, −1.9. The final product had 15% moisture, 0.63% nitrogen, pH 9, cationic efficiency 100%, and SCV at pH 10, +7.4.

EXAMPLE 6

Example 1 was repeated excepting 2.6 g. (1.3 weight percent) powdered sodium hydroxide and 24 g. of the etherifying reagent were used. After the initial mixing, the material was removed from the reactor, bottled, and stored at 25° C. Analyses at various reaction time periods were pH 5, cationic efficiency 71, 88, 99%, and SCV at pH 10, +2.7, —, +5.5 at 1, 4, and 8 days, respectively. The final product had 14% moisture and 0.70% nitrogen.

EXAMPLE 7

Example 1 was repeated excepting 3.6 g. (1.8 weight percent) powdered calcium oxide and 28.4 g. of the etherifying reagent were used. After initial mixing, samples were removed, bottled, and stored at 25° C. and 60° C. The rest of the sample was mixed at 60° C. for 6 hours in the reactor. Table I gives results of analyses at various reaction time periods.

EXAMPLE 8

Example 7 was repeated excepting commercial wheat flour (15% moisture and 1.66% nitrogen) was substituted for wheat starch and 5 g. (2.5 weight percent) powdered calcium oxide and 38.2 g. of the etherifying reagent were used. Table II gives results of analyses at various reaction time periods.

Table 1

| | Reaction conditions | | Continued mixing after addition | | Results | |
|---|---|---|---|---|---|---|
| Ex. | Time | Temp. °C. | | pH | % Cationic Efficiency | SCV. pH 10 |
| 7 | 0 | 25 | — | 8 | 68 | −1.4 |
| 7A | 1 day | 25 | no | 8 | 96 | +4.9 |
| 7A | 2 days | 25 | no | 8 | 100 | +4.9 |
| 7B | 6 hours | 60 | yes | 8 | 100 | +5.3 |
| 7C | 6 hours | 60 | no | 8 | 100 | +3.7 |

Products A, B, and C have 14% moisture and 0.76% nitrogen.

Table II

| | Reaction conditions | | Continued mixing after addition | | Results | |
|---|---|---|---|---|---|---|
| Ex. | Time | Temp. °C. | | pH | % Cationic efficiency | SCV, pH 10 |
| 8 | 0 | 25 | — | 7 | 63 | −1.9 |
| 8A | 6 hours | 25 | no | 7 | 94 | +2.3 |
| 8A | 1 day | 25 | no | 7 | 100 | +5.5 |
| 8B | 6 hours | 60 | yes | 7 | 100 | +3.8 |
| 8C | 6 hours | 60 | no | 7 | 100 | +5.5 |

Products A, B, and C have 13% moisture and 2.38% − 1.66% (unmodified flour) = 0.72% nitrogen due to the reaction with the etherifying reagent.

EXAMPLE 9

Example 6 was repeated excepting commercial corn flour (12% moisture and 1.20% nitrogen) was substituted for wheat starch and 4.48 g. (2.24 weight percent) powdered calcium oxide and 38.2 g. of the etherifying reagent were used. After the initial mixing, samples were bottled and stored at 25° C., 80° C., and 100° C.

Table III gives results of analyses at various reaction time periods.

Table III

| Ex. | Time | Temp. °C. | Continued mixing after addition | pH | % Cationic efficiency | SCV, PH 10 |
|---|---|---|---|---|---|---|
| 9 | 0 | 25 | — | 7 | 50 | −1.9 |
| 9A | 6 hours | 25 | no | 7 | 76 | — |
| 9A | 1 day | 25 | no | 7 | 86 | — |
| 9A | 2 days | 25 | no | 7 | 99 | +5.5 |
| 9B | 4 hours | 80 | no | 7 | 100 | +6.2 |
| 9C | 2 hours | 100 | no | 7 | 100 | +5.5 |

Products A, B, and C have 13% moisture and 1.90% − 1.20% (unmodified flour) = 0.70% nitrogen due to the reaction with the etherifying reagent.

EXAMPLE 10

This example illustrates the cyclization of 3-chloro-2-hydroxypropyltrimethylammonium chloride to form the epoxide of the etherifying reagent before adding it to the starch. The resultant epoxide reagent corresponds to the epoxide reagents employed by the several prior art references discussed above. A solution containing 6.8 g. of sodium hydroxide (3.4 weight percent based on starch) was added to a solution (22.7 g.) of the etherifying reagent and allowed to stand ½ hour at 25° C. Two hundred grams (dry basis) of the wheat starch was placed in the sigma blade mixer and the epoxide was sprayed onto the mixing starch in about 10 minutes. Mixing was continued for ½ hour before removing the initial sample for analyses. Mixing was continued for 6 hours maintaining the temperature at 60° C. The product was then removed from the reactor, bottled, stored at 25° C., and analyzed periodically. The results are given in Table IV. The product had 15% moisture and 0.60% nitrogen. Cationic efficiency tests and Streaming Current measurements indicate that even after 1 month of reaction time the product from Example 10 is inferior and inoperative as compared with the cationic products obtained from the prior Examples 1 through 9 illustrating the instant invention.

Table IV

| Ex. | Time | Temp. °C | Continued mixing after addition | pH | % Cationic efficiency | SCV, pH 10 |
|---|---|---|---|---|---|---|
| 10 | 0 | 25 | — | 11 | 51 | −3.1 |
| 10 | 6 hours | 60 | yes | 11 | 51 | −3.1 |
| 10 | 1 day | 25 | no | 11 | 54 | — |
| 10 | 10 days | 25 | no | 11 | 51 | — |
| 10 | 1 month | 25 | no | 10 | 59 | −3.5 |

EXAMPLE 11

This example illustrates the aqueous slurry reaction of starch with 3-chloro-2-hydroxypropyltrimethylammonium chloride as consistent with the prior art procedures of several of the references discussed above. Starch, 15 g. (dry basis), was slurried in 1 liter of water containing 0.9 g. sodium hydroxide (6 weight percent based on starch). The etherifying reagent, 1.8 g. of solution, was then added while the mixture was being mechanically stirred. The slurry was finally passed through a steam jet cooker under conditions cited in Die Stärke 28(5): 174 (1976). One half of the solution paste was left as is (sample A). The other half was neutralized to pH 7-8 with dilute hydrochloric acid (sample B). The experiment was repeated (sample C) excepting less sodium hydroxide, 0.2 g. (1.3 weight percent based on starch), was used and the neutralization was also left out. The results of paste analyses are given in Table V. Dried samples A, B, C had 2% moisture and 0.60% nitrogen.

Table V

| Ex. | Time | Temp. °C. | Continued mixing after addition | pH | % Cationic efficiency | SCV, pH 10 |
|---|---|---|---|---|---|---|
| 11A | 0 | 25 | no | 11 | 68 | −1.4 |
| 11A | 1 day | 25 | no | 11 | 67 | −1.4 |
| 11A | 3 days | 25 | no | 11 | 63 | −1.4 |
| 11B | 0 | 25 | no | 8 | 59 | −3.6 |
| 11B | 3 days | 25 | no | 8 | 58 | −3.6 |
| 11C | 0 | 25 | no | 7 | 58 | −2.5 |
| 11C | 1 day | 25 | no | 7 | 51 | −2.5 |
| 11C | 3 days | 25 | no | 7 | 46 | −2.5 |

EXAMPLE 12

This example illustrates Streaming Current measurements over a pH range 4 to 11 of both commercial and experimental cationic starches. Results are given in Table VI. One can readily see from data in Table VI that the cationic starches (Example 3) of this invention are far superior in charge magnitude to the prior art cationic starches.

Table VI

| Sample | Original pH | Original SCV | *Adjusted pH | *Adjusted SCV | *Adjusted pH | *Adjusted SCV | *Adjusted pH | *Adjusted SCV |
|---|---|---|---|---|---|---|---|---|
| "Cato 8," tertiary alkyl starch ether made by U.S. Pat. No. 2,813,093 | 4.0 | +10 | 10 | −3.8 | 11 | −6.0 | | |
| "Stalok 300," quaternary ammonium alkyl ether made by U.S. Pat. No. 3,346,563 | 6.0 | +11 | 10 | +2.2 | 11 | −3.0 | 4.0 | +6.0 |
| Example 3, quaternary ammonium alkyl starch made by this patent | 6.0 | +16.5 | 10 | +9.3 | 11 | −1.8 | 4.0 | +18.3 |

*pH adjusted with either 1N NaOH or HCl.

EXAMPLE 13

Bleached handsheets containing clay pigment and unbleached handsheets were prepared and tested as described above following the addition of a 1% aqueous paste (steam jet cooked) product. Superior cationic products of this invention as represented by Examples 3, 7A, and 9C were compared to inferior prior art cationic starches as prepared in Examples 10 and 11, and also to representative commercial cationic starches set forth in the above Example 12. Results are given in Table VII. Examples 3, 7A, 9C were far superior in increasing burst and tensile strengths in bleached and unbleached handsheets than the products of Examples 10, 10**, 11A, 11B, 11C, and the commercial starches; and 67–117% better in pigment retention than the best of these latter samples, "Stalok 300."

It is to be understood that the foregoing detailed description is given by way of illustration and that modification and variations may be made therein without departing from the spirit and scope of the invention.

Table VII

| | 1% Addition of sample to handsheets | | | | |
|---|---|---|---|---|---|
| | Unbleached paper | | Pigment bleached paper | | |
| Sample | % Burst | % Tensile | % Burst | % Tensile | % Ash* |
| Example 3 | 63 | 26 | 19 | 13 | 13 |
| Example 7A | 60 | 27 | 19 | 13 | 13 |
| Example 9C | 40 | 28 | 12 | 14 | 10 |
| Example 10 | 16 | 0 | 4 | 12 | −4 |
| Example 10** | 18 | 7 | 7 | 7 | −1 |
| Example 11A | 0 | 4 | 18 | 15 | −10 |
| Example 11B | 1 | 9 | 7 | 11 | −3 |
| Example 11C | 1 | 7 | 4 | 6 | 4 |
| "Cato 8" | 38 | 24 | 12 | 16 | −0.3 |
| "Stalok 300" | 41 | 22 | 15 | 11 | 6 |

* Percent increase over control paper containing no sample.
**Sample neutralized to pH 7 with HCl solution before adding to handsheets.

We claim:

1. A method for preparing cationic starchy materials without forming the epoxide outside the reaction mixture comprising reacting a starch-containing material (SCM) with an etherifying reagent having the structural formula

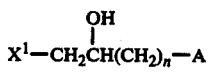

wherein:
A is

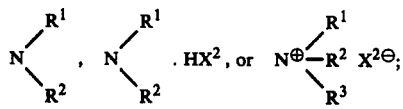

$R^1$ and $R^2$ are independently selected from the group of $C_1-C_4$ straight or branched alkyl radicals or they are joined to form a cyclic structure, and $R^3$ is hydrogen or a $C_1-C_4$ straight or branched alkyl radical, with the proviso that the total number of carbon atoms in $R^1$, $R^2$, and $R^3$ does not exceed 8; $X^1$ and $X^2$ are halogen atoms; and $n$ is 1-3, wherein said SCM and said etherifying reagent are reacted in a dry state at a pH in the range of 5-9.

2. The method as described in claim 1 wherein said SCM is selected from the group consisting of cereal grain starches, cereal grain flours, root crop starches, and root crop flours.

3. The method as described in claim 1 wherein for said etherifying reagent A is selected from the group consisting of $N^{\oplus}(CH_3)_3 X^{2\ominus}$ and $N^{\oplus}(CH_2CH_3)_3 X^{2\ominus}$, and $n$ is equal to 1.

4. The method as described in claim 3 wherein for said etherifying reagent $X^1$ and $X^2$ are both chlorine atoms.

5. The method as described in claim 4 wherein said etherifying reagent is 3-chloro-2-hydroxypropyltrimethylammonium chloride,

6. The method as described in claim 1 wherein the amount of said reagent is such that it provides less than 0.9% nitrogen based upon the dry weight of said SCM.

7. The method as described in claim 1 wherein the amount of said reagent is such that it provides 0.3-0.8% nitrogen based upon the dry weight of said SCM.

8. The method as described in claim 1 wherein said SCM and said etherifying reagent are reacted at a temperature within the range of about 25°-100° C. for an inversely related time period of 1 week to 2 hours.

9. The method as described in claim 1 wherein said SCM and said etherifying reagent are reacted at a temperature within the range of 25°-60° C. for an inversely related time period of 6 to 2 hours.

10. The method as described in claim 1 wherein said SCM and said etherifying reagent are subjected to a mixing action throughout the time they are reacted.

11. The cationic starchy materials produced by the process of claim 1.

* * * * *